Figure 1:
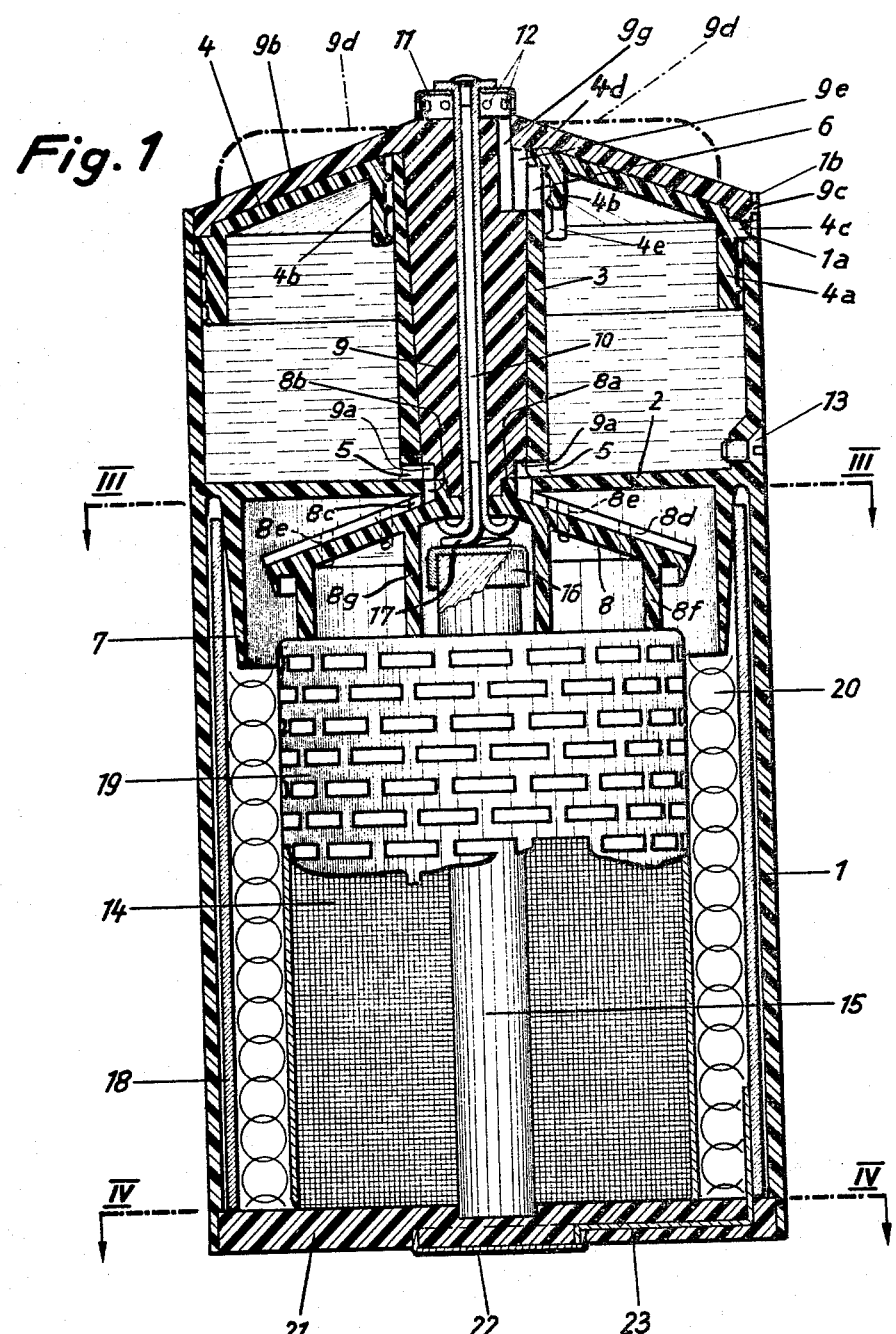

Sept. 27, 1966   L. SCHMID-WILDY   3,275,477
ROD SHAPED BATTERY WITH SYNTHETIC MATERIAL CASING
Filed Jan. 7, 1964   2 Sheets-Sheet 1

INVENTOR:
LUDWIG SCHMID-WILDY
by Jacob L. Kollin

ROD SHAPED BATTERY WITH SYNTHETIC
MATERIAL CASING
Ludwig Schmid-Wildy, Irschenberg uber Miesbach,
Upper Bavaria, Germany
Filed Jan. 7, 1964, Ser. No. 336,262
Claims priority, application Germany, Jan. 8, 1963,
Sch 32,571
4 Claims. (Cl. 136—90)

The invention relates to a rod shaped battery with a synthetic material casing, in the upper part of which there is provided an annular closed tank with a filler opening and a bottom outlet opening, which are released only when the battery is placed in operation.

The object of the invention is to provide the battery with an unlimited storage capability and to activate the zinc and carbon with electrolyte only when necessary and particularly to replenish the electrolyte, to make possible a complete employment of the depolarizer.

According to the invention there is provided a rod shaped battery with a synthetic housing, the upper part of which has an annular closed tank with a filler opening and outlet openings at the bottom, the openings being released only when the battery is placed in operation. The battery is characterized by a cylinder in a tank container provided with electrolyte outlet openings spaced equiangularly from the center above an intermediate bottom, an air inlet opening on the top, a rotatable sealing cone which is provided with an oppositely disposed air passage when in open position and a collar of an umbrella-like shield which covers a carbon briquette.

A sealing cone is permanently secured to a superimposed brass cap with air passage openings and the latter is permanently secured to the umbrella-like shield by means of a centrally inserted tubular rivet. The sealing cone extends on top as a roof-shaped housing cover which rests on a non-rotatable tank cover having an air passage opening, so that in the open position of the sealing cone the outside air enters the tank space and the electrolyte passes out therefrom.

In order to provide an advantageous connection between the sealing cone and the umbrella it is further proposed, according to the invention, to mount the lower part of the sealing cone and to draw it in and to mount it in a corresponding recess of the umbrella-like shield collar.

It is particularly advantageous to press the contact spring which abuts the carbon rod into the tubular rivet.

Furthermore according to the invention, all parts, except certain electrical parts are made of synthetic material, so that generally used insulation materials are obviated, whereby the battery production costs are substantially reduced.

It is further proposed, according to the invention, to employ a zinc cylinder, so that it may consist of practically pure thin-walled zinc instead of the usually drawn container which must contain alloy elements.

Furthermore in order to provide a more secure mounting, it is proposed according to the invention to mount the galvanically coated carbon rod in its central position by means of a corresponding bottom recess and an umbrella collar.

Further advantageous modifications will become apparent from the following description and the accompanying drawings forming the specification of the invention.

These and other important objects of the invention will become apparent from the following description and the accompanying drawing illustrating a preferred embodiment of the invention.

It should be understood, however, that these are given by way of illustration and not of limitation, and that various changes in the details, form and arrangement of the parts may be made without departing from the scope of the invention.

Figure 2:
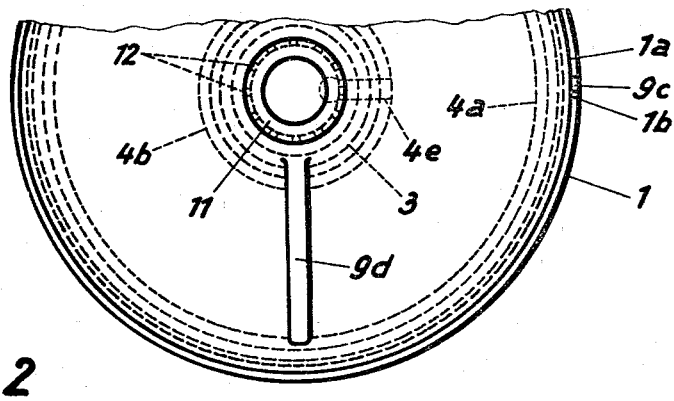
Figure 3:
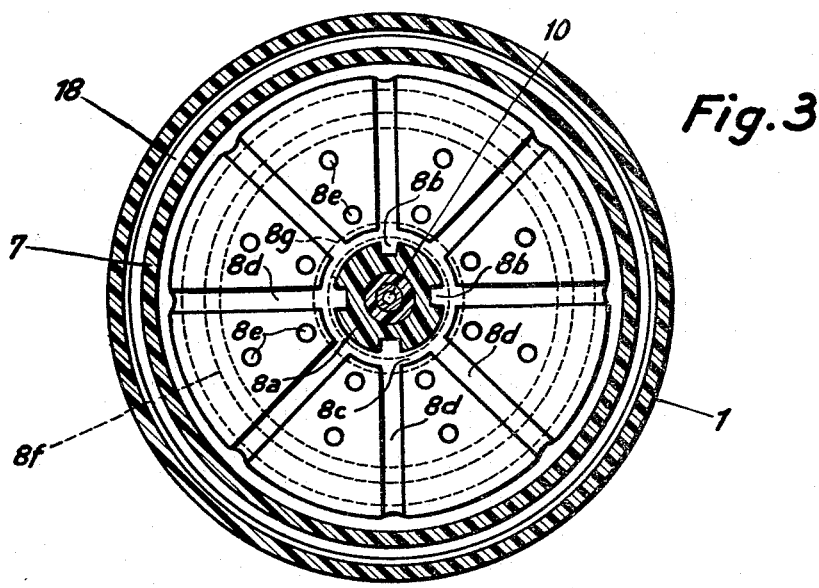
Figure 4:
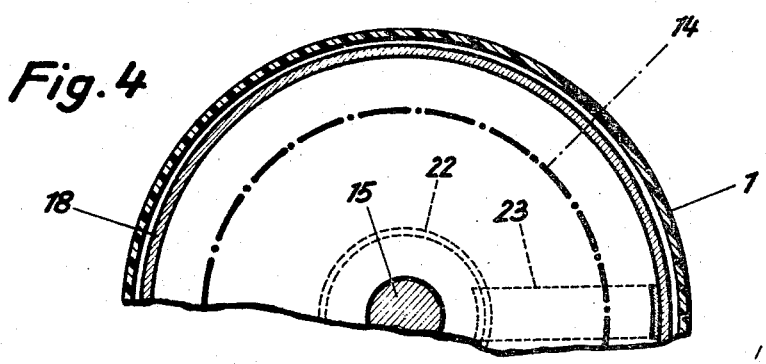

In the drawings:
FIG. 1 is a view in elevation;
FIG. 2 is a partial plan view of the upper part of the housing cover;
FIG. 3 is a cross-section taken on line III—III of FIG. 1 and
FIG. 4 is cross-section taken on line IV—IV of FIG. 1.

Referring now to the drawings in detail, a circular housing 1, of translucent synthetic material, having an intermediate bottom or partition 2 is provided with a cylinder 3 which extends to a tank cover plate 4. The cylinder 3 is provided at its bottom with four centrally arranged passage openings 5 for the electrolyte and with an air inlet opening 6 at the top. The partition 2 has at its underside a protecting collar 7, the function of which will be explained later. The housing 1, the partition 2, cylinder 3 and collar 7 are molded in one piece.

Mounted in the free circular space of the partition, by means of a collar 8a, is an umbrella-shaped part 8 which covers a carbon briquette 14. The collar 8a is provided on its periphery with concentrically disposed vertical discharge slots 8b which are aligned with passage openings 5 of the cylinder 3 and which terminate in a circular slot 8c, whence extend radially outwardly slots 8d which form drip noses at the outer umbrella edge. In addition there are provided in the umbrella gas outlet openings 8e. On the underside of the umbrella there are provided an outer collar 8f and an inner collar 8g which extend to the upper surface of the carbon briquette.

The electrolyte container formed by the partition 2 and cylinder 3 is sealed on top by the tank seal cover 4 formed with walls 4a and 4b, provided with sealing rings, in order to prevent an undesirable leakage of the electrolyte out of the container. The tank cover 4 is seated with an edge extension 4c in an inner wall recess 1a of the housing.

A closing plug 9 with an upwardly increasing diameter is seated in the cylinder 3. The closing plug 9 is provided at its outer edge with several recesses 9a in such a manner that the electrolyte may reach the radial outlet recesses 8d through the openings 5, recesses 9a, 8b and the circular recess 8c.

The closing plug 9 extends at the top as a roof-shaped housing cover shaped to correspond with the tank cover 4 and has a nose 9c on its outer edge, which serves as a stop for an "on" or "off" position. The nose is received in an edge recess 1b of the housing 1. The housing cover 9b is also provided with a hand grip 9d. By turning the housing cover 9b and thus the closing plug 9, the recesses 9a are moved into a position opposite the passage openings 5 and the recesses 8b, thus enabling the electrolyte to enter the interior of the zinc and carbon container.

The closing plug 9 protrudes partly into a recess of the collar 8a of the umbrella 8. Both parts are held together by means of a rivet 10, the rivet shaft extending through a brass cap 11 with an air inlet opening 12 and being locked thereon.

In the upper part of the closing plug 9 there is provided a vertical edge recess 9e which opens into a bore 9g of the closing plug and the cover 9b. The outside air can thus enter into the interior of the tank space through the openings 12, the above mentioned bore 9g the edge recess 9e, slot 6 of cylinder 3 and a slot 4e of the wall 4b in the housing. The electrolyte thereby enters the interior of the element through the openings 5, 9a and 8b. A battery is thus brought into working position. A nose 4d extends into the air shaft 6 to prevent the turning of the tank cover and to additionally assure a better seal.

The filling with electrolyte takes place through an opening which may be closed by means of screw 13.

The carbon briquette 14 with a carbon rod 15 is mounted in the container under the tank bottom 2. The contact cap 16 makes contact with a contact spring 17 which is pressed into the tubular rivet 10. The carbon briquette is surrounded by a zinc cylinder 18 which extends into the space formed by the housing 1 and the protective collar 7 (FIG. 3). Cotton 20, or the like, is inserted between the zinc cylinder 18 and the carbon briquette 14 which is covered with a protective wrapping 19.

The container is closed at the bottom by means of a bottom 21. During the molding there is first inserted into the mold a contact cap 22 with a contact lug 23, the other end of which is later permanently secured to the zinc cylinder 18. In order to provide a better securing of the carbon rod 15, a corresponding depression is additionally provided in the bottom 21.

What I claim is:

1. In combination, a closed cylindrical housing of synthetic material, having an integral partition extending transversely of the housing and dividing said housing into an upper tank chamber and a lower chamber, said partition having passages for the flow of electrolyte from said upper tank chamber to said lower chamber, air inlets for said tank chamber, valve means for opening and closing said passages and said air inlets, said valve means comprising a cylinder extending centrally and upwardly of said partition to the top of said housing, a closing plug rotatable in said cylinder, said cylinder having bottom openings communicating with said passages for electrolyte in said partition, the top portion of said cylinder having an air inlet opening, said closing plug having bottom recesses alignable with said bottom openings and said passages, said closing plug having a top recess for entry of air, alignable with said air inlet opening, a carbon briquette mounted in said lower chamber, a zinc cylinder extending about said briquette and spaced therefrom, first contact means secured to said carbon briquette and extending outwardly through the top of said housing and second contact means secured to said zinc cylinder and extending outwardly of the bottom of said housing.

2. The combination according to claim 1, wherein the top portion of said plug is formed as a housing cover extending over said tank cover plate, a brass cap secured to the top portion of said plug, said cap having air inlet passages therein communicating with said closing plug's top recess.

3. The combination according to claim 2, further provided with an umbrella-shaped part disposed below said partition and in axial engagement with the bottom portion of said plug, the top surface of said umbrella-shaped part being formed with concentrically disposed vertical discharge slots aligned with the passages of said partition, a circular slot communicating with said vertical discharge slots, slots extending radially from said circular slot to form drip noses for an electrolyte, downwardly extending outer and inner collars, the bottom edges of said collars abutting the top portion of said carbon briquette.

4. The combination according to claim 3, further provided with a carbon rod extending through said briquette into said inner collar, the top portion of said rod being provided with a contact cap, the bottom portion of said rod extending part way into the bottom of said cylindrical housing, a tubular rivet extending through said umbrella-shaped part, through said closing plug and through said brass cap for securing these together, said first contact means comprising a contact spring extending into said tubular rivet and engaging said contact cap.

References Cited by the Examiner
UNITED STATES PATENTS

| 2,810,776 | 10/1957 | Brill et al. | 136—90 |
| 2,847,494 | 8/1958 | Jeannin | 136—114 |
| 2,935,547 | 5/1960 | Kordesch | 136—90 |

WINSTON A. DOUGLAS, *Primary Examiner.*

A. SKAPARS, *Assistant Examiner.*